United States Patent
Rahbar

(10) Patent No.: US 8,243,759 B2
(45) Date of Patent: Aug. 14, 2012

(54) CLOCK RECOVERY METHOD OVER PACKET SWITCHED NETWORKS BASED ON NETWORK QUIET PERIOD DETECTION

(75) Inventor: Kamran Rahbar, Kanata (CA)

(73) Assignee: Microsemi Semiconductor Corp., Kanata, ON (CA)

( * ) Notice: Subject to any disclaimer, the term of this patent is extended or adjusted under 35 U.S.C. 154(b) by 44 days.

(21) Appl. No.: 13/015,381

(22) Filed: Jan. 27, 2011

(65) Prior Publication Data

US 2011/0194438 A1    Aug. 11, 2011

(30) Foreign Application Priority Data

Feb. 10, 2010   (GB) .................... 1002217.6

(51) Int. Cl.
*H04J 3/06* (2006.01)

(52) U.S. Cl. .................................................. 370/503

(58) Field of Classification Search ............. None
See application file for complete search history.

(56) References Cited

U.S. PATENT DOCUMENTS

| | | | |
|---|---|---|---|
| 6,658,025 B2 | 12/2003 | Mauritz | |
| 7,020,791 B1 * | 3/2006 | Aweya et al. | 713/400 |
| 7,130,368 B1 * | 10/2006 | Aweya et al. | 375/376 |
| 7,315,546 B2 | 1/2008 | Repko | |
| 2004/0114607 A1 | 6/2004 | Shay | |
| 2009/0163246 A1 | 6/2009 | Mullen | |
| 2010/0085990 A1 * | 4/2010 | Belhadj et al. | 370/517 |
| 2011/0286442 A1 * | 11/2011 | Maurice et al. | 370/350 |

FOREIGN PATENT DOCUMENTS

WO    98/04063    1/1998

\* cited by examiner

*Primary Examiner* — Raj Jain

(74) *Attorney, Agent, or Firm* — Marks & Clerk; Richard J. Mitchell

(57) ABSTRACT

A method of recovering timing information in a packet network, involves detecting quiet periods in the packet network when network packet delay variation (PDV) is low. A frequency prediction unit is trained during the quiet periods to learn output clock variations of a timing recovery unit to permit the frequency prediction unit to predict frequency update values for a local oscillator during non quiet periods taking into account the historical output clock variations during quiet periods. The output of the frequency prediction unit is used as the active frequency update values during non quiet periods.

18 Claims, 3 Drawing Sheets

CLOCK RECOVERY METHOD OVER PACKET SWITCHED NETWORKS BASED ON NETWORK QUIET PERIOD DETECTION

FIELD OF THE INVENTION

This invention relates to a method of clock recovery over packet switched networks.

BACKGROUND OF THE INVENTION

Synchronization refers to the requirement that transmit and receive ends of a digital communication networks operate at the same clock rate. A network clock located at transmitter node controls the rate at which data is transmitted. A second network clock located at the receiver controls the rate at which data is read. For the receiver to properly interpret incoming data, its clock needs to be synchronized to the transmitter clock.

There are different ways of synchronizing clocks over networks. In some network configurations, which are synchronous, (e.g TDM networks), transmitter clock information can be extracted directly from the data and used in the receiver to synchronize the two clocks. Due to low cost and availability of packet networks, many service providers are looking into transporting legacy services (such as TDM services) over IP based networks. The main problem is how to maintain the same level of synchronization as in legacy network. Although there are different approaches for solving this problem but the one approach that has potential many advantages over the others (including cost and availability) is clock synchronization over packet networks using dedicated timing packets.

FIG. 1 shows an illustration of this approach. At the transmitter side dedicated timing packets are time-stamped by the transmitter's clock and then are sent over the packet switched network (PSN) to one or multiple receivers. At the receiver side these timing packets are time-stamped by the receiver clock as they arrive. The difference between these two times tamps represents the relative delay between transmitter and receiver's clocks, which then can be used to synchronizes the two clocks. Among advantages of this approach are the fact that it does not require extra means or modification of the physical layer for synchronizing the clocks and that fact that it is widely available (as long as there is IP network). Nonetheless this approach has its own challenges.

One of the main challenges in this synchronization approach is that the timing packets are subjected to packet delay variations (PDV) inherent to any packet switched network. As a result, at the receiver side, depending on packet delay variations, the recovered reference clock will have high level of jitter and wander, which is not acceptable for many applications, especially legacy services that require high quality level of synchronization.

To overcome this issue, prior art suggest methods based on filtering timing packets at the receiver such that only those timing packets that are least subjected to packet delay variations used for clock recovery.

U.S. Pat. No. 6,658,025 describes a method for filtering timing packets where the expected arrival time for each timing packet is estimated and compared to the actual arrival time. A number of timing packets with most deviations from expected value are then discarded and the remaining timing packets are used to recalculate a new expected value for arrival time. The new calculated expected value again is used to discard a new series of timing packets and this process continues until a certain number of timing packets have been discarded. In this elimination process, the remaining timing packets are used to correct any frequency offset between transmitter and receiver clocks.

U.S. Pat. No. 7,315,546 discloses a method that, instead of discarding timing packets, uses a weighted set of timing packets to synchronize the receiver and transmitter clocks. Weightings are calculated based on the distance between the expected arrival time and the actual arrival time of the timing packets in this fashion that timing packets with largest distance from expected delay will be given least amount of weighting.

Clock recovery performance of above methods and other prior art is susceptible to network PDV and at times it cannot be guaranteed for certain network PDVs that usually exists because of high traffic loading (e.g when network is loaded with 80% or more of traffic). A common solution to this is to stop the clock recovery algorithm during these high traffic periods and put the algorithm into hold-over mode where it will update the DCO using a fixed value based on the past DCO update values. A drawback of this approach is that it will result in phase and frequency drift of output clock.

SUMMARY OF THE INVENTION

According to a first aspect of the invention there is provided a method of recovering timing information in a packet network, comprising receiving timing packets from a network; detecting quiet periods in the packet network when network packet delay variation (PDV) for the timing packets is low; training a frequency prediction unit during said quiet periods to learn output clock variations of a timing recovery circuit to permit the frequency prediction unit to predict frequency update values for a local oscillator during non quiet periods taking into account the historical output clock variations during quiet periods; and using the output of the timing recovery circuit as the active frequency update values during quiet periods and said frequency prediction circuit as the active frequency update values during non quiet periods.

Embodiments of the invention take advantage of the certain time periods where network traffic is low or quiet low and as have a result lower PDV. As a result the recovered clock will have the least amount of wander and noise due to network packet delay variations. During these quiet periods, the output of clock recovery algorithm is used to train a time series prediction circuit. At later times when network traffic is heavy time series predictor is used to predict clock recover algorithm output clock based on past training data. An accept-rejection algorithm is used to compare predicted values with actual values calculated by timing recovery algorithm and decide on best value for the output clock. An advantage of proposed invention compared to prior art is increased robustness to network packet delay variations especially during periods of high traffic loading.

During the training period, the time series predictor tries to learn the filtered clock variations. The output the time series predictor is then used as an additional constraint on the output of the clock recovery algorithm. During high network traffic when output of clock recover algorithm may not be reliable, the output of the time series prediction is used through a non-linear process to estimate the best clock output value. In this fashion, the clock recovery algorithm continues updating output clock even under high traffic conditions without going into hold over mode.

In one embodiment automatic detection of network quiet periods (i.e. detecting when network PDV is most suitable for clock recovery) is done through a network activity detector which detects when network traffic is not present or is low using statistics of network packet delay variations. The time series predictor during these quiet periods learns output clock variations of the timing recovery algorithm. During quiet periods the output of time series predictor is used to predict the output clock of the timing recovery algorithm; and during non quiet periods select between the predicted output by the time series predictor and the output of the clock recovery algorithm through an accept-reject algorithm which takes into account duration of non-quiet period time. Based on this algorithm when certain conditions have been met, the output of the clock recovery algorithm is rejected and replaced with the predicted value of time series predictor.

In another aspect the invention provides a timing recovery unit for use in a packet network, comprising a local oscillator for producing a local output clock; a timing recovery circuit responsive to timing packets received over a network to produceg frequency update values for the local oscillator; an activity detector for detecting quiet periods in the packet network when network packet delay variation (PDV) of the timing packets is low; a frequency prediction circuit for predicting update values for the local oscillator during non quiet periods, and wherein the frequency prediction circuit is configured to learn output clock variations of a timing recovery unit to permit the frequency prediction unit to use the historical clock variations to predict frequency update values during non quiet periods; and a selection circuit for selecting the output of said frequency prediction unit as the active frequency update values for the local oscillator during non quiet periods and the output of the timing recovery circuit as the active frequency update values for the local oscillator during quiet periods.

BRIEF DESCRIPTION OF THE DRAWINGS

The invention will now be described in more detail, by way of example only, with reference to the accompanying drawings, in which:—

DETAILED DESCRIPTION OF AN EMBODIMENT OF THE INVENTION

In the discussion which follows, the following notation is used:

k is index to packet number.
x(k) represents transmitter time stamp for packet k
y(k) represents transmitter time stamp for packet $\bar{k}$
z(k) is the raw delay estimate between transmitter and receiver for timing packet k
w(k) is the filtered raw delay for timing packet $\bar{k}$
$f_d$ is the DCO update value.
$f_c$ is output of the timing recovery algorithm.
$f_e$ is the predicted value by time series predictor.
$T_p$ is the prediction time.

Figure 1:
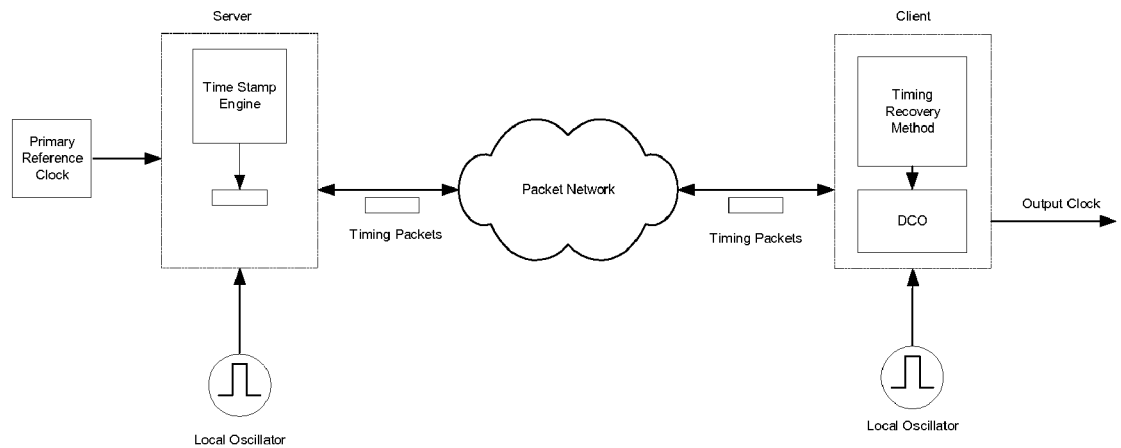
FIG. 1 is a high level block diagram of showing the timing recovery mechanism over packet networks.
Figure 2:
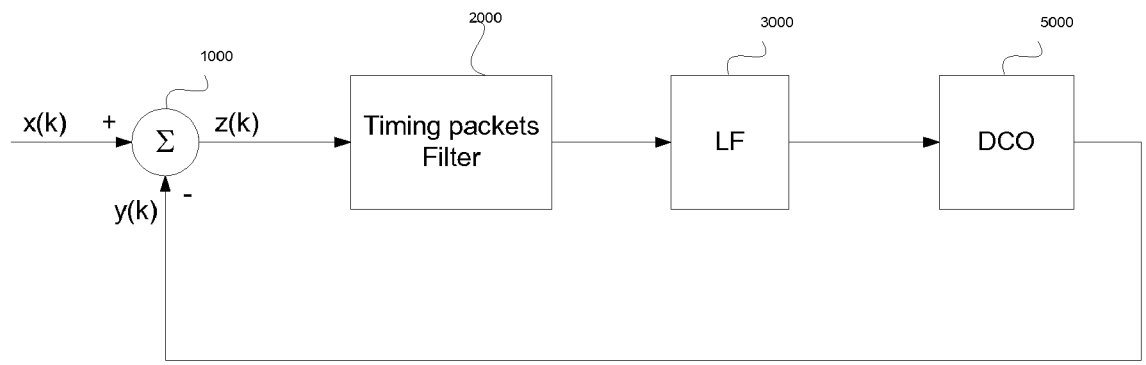
FIG. 2 is a block diagram of a prior art technique.

The prior art circuit shown in FIG. 2 comprises a chain consisting of a adder 1000, a timing packet filter 2000, a loop filter 3000 and a digital controlled oscillator (DCO) 5000 with a feedback loop to the adder 1000. The filter 2000 filters out packets with a large PDV.

Figure 3:
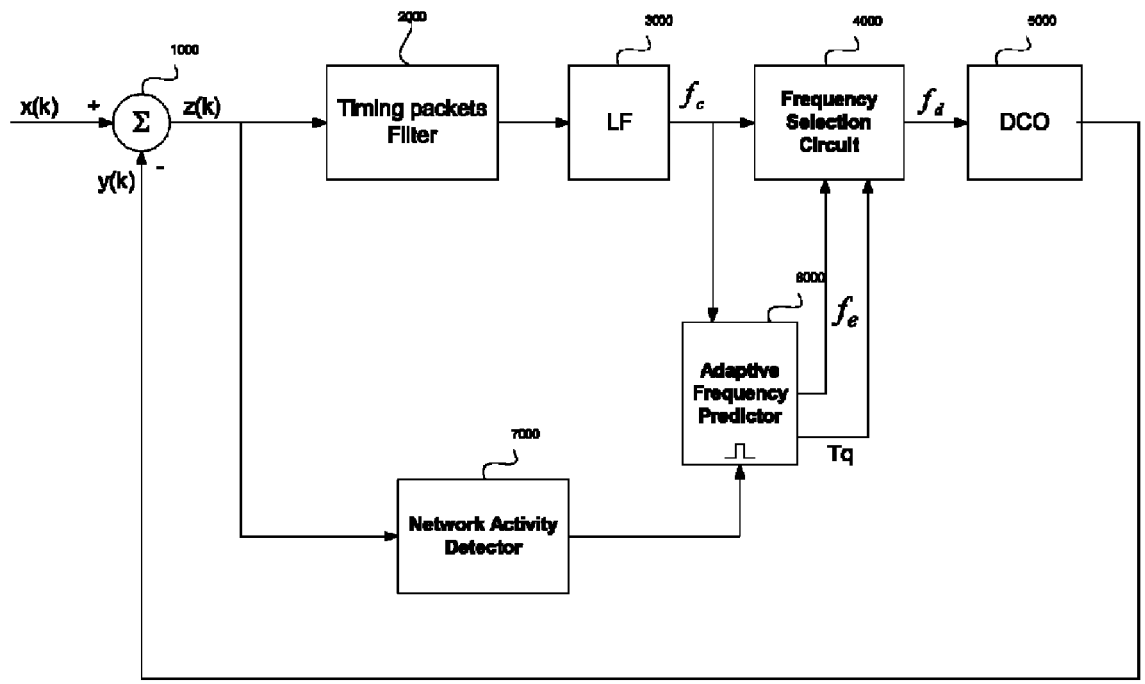
FIG. 3 is a block diagram showing an embodiment of the present invention.

FIG. 3 shows a top level block diagram of a timing recovery circuit in accordance with an embodiment of the invention.

(z(k)) represents raw delays for timestamp k, calculated by subtracting receiver local time stamps (y(k)) generated by a DCO (digital controlled oscillator) 5000 from corresponding time-stamps generated by the transmitter (x(k)). In general raw delays (z(k)) are subject to noise due to network packet delay variations. Block 2000 is used to remove the effect of packet delay variations by filtering out the noise from raw delay estimates. Loop filter 3000 calculates frequency update value for the DCO 5000 based on filtered delays. The performance of such a clock recovery algorithm depends highly on how well noise due to packet delay variations can be filtered out from raw delay estimates by the filter 2000. The degree of difficulty in filtering out the PDV noise depends on the statistical properties of the noise and its magnitude. Since in packet networks, the traffic is dynamically changing, the magnitude and nature of PDV also dynamically changes. Because of this while at some period of time noise due to PDV can be easily filtered out, at other periods it can only partially be removed, resulting in degraded performance of the clock recovery circuit.

To improve robustness to non-stationary nature of PDV, embodiments of the present invention take advantage of the dynamic nature of network PDV. During times when the network PDV is low (for example when there is low network traffic activity), the adaptive frequency prediction (AFP) block 6000 tries to learn the clock variations at the output of the clock recovery algorithm (blocks 2000 and 3000) using a time series predictor. The output of AFP 6000 then is used to control the output of the clock recovery circuit to maintain performance even during peak network traffic periods.

Figure 4:
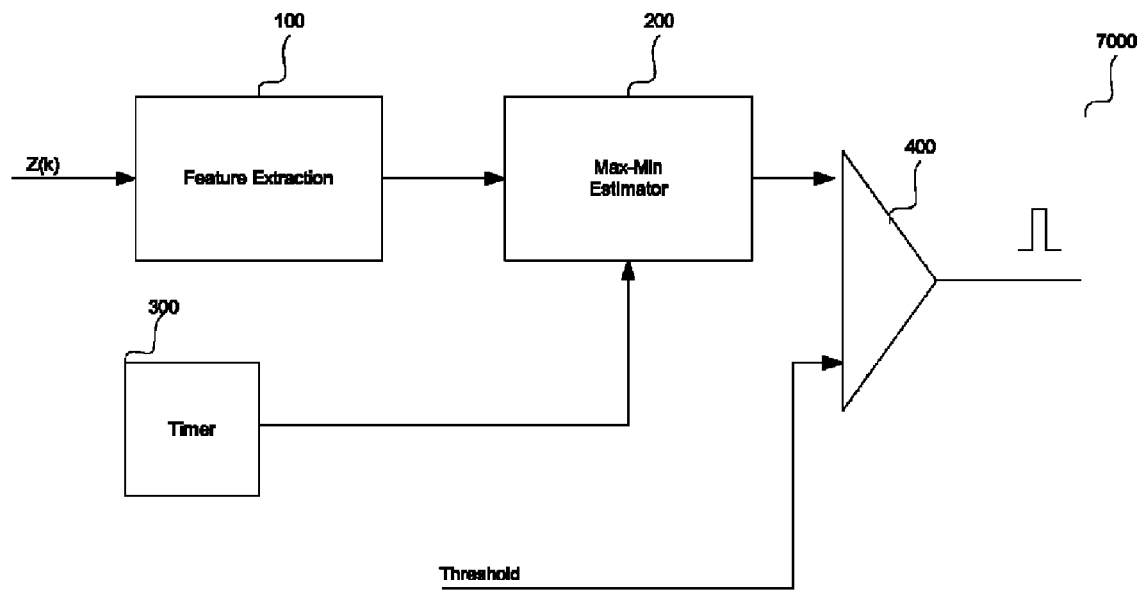
FIG. 4 is a block diagram of a network activity detector.

The detection of the network quiet periods is done automatically, through a network activity detector 7000, shown in more detail in FIG. 4. This comprises a feature extraction block 100, which can be as simple as a block to measure the variance of the raw delays or more a more elaborate one that, for example, measures the variance of minimum delays ($z_{min}$(k)) over some time periods.

A min-max estimator block 200 where it finds minimum and maximum values of the extracted features over a time period T.

A comparator block 400 compares the difference between the maximum and minimum values of extracted features and a threshold value. If the difference is less than a certain threshold value then a quiet period has been detected.

The output of network activity detector is used to enable or disable the training mode of adaptive frequency predictor 6000.

Figure 5:
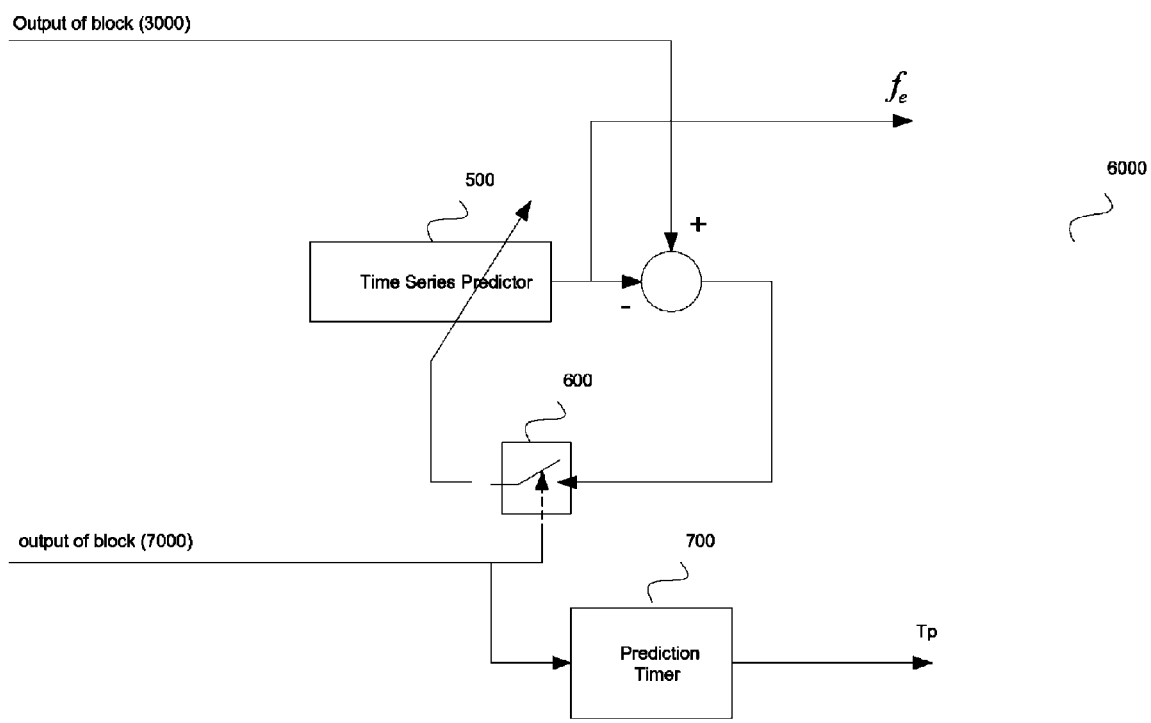
FIG. 5 is a block diagram of adaptive frequency predictor.

As is shown in FIG. 5, block 6000 consists of a time series predictor 500, which predicts DCO update values, a switch 600 and a prediction timer 700.

There are different ways for implementing a time series predictor. One method involves using a Kalman filter.

The output of the block 3000 can be considered a random process with state model of $$x_n = F_{n-1} \cdot x_{n-1} + w_n \quad (1)$$

and $$y_n = H_n \cdot x_n + v_n \quad (2)$$

where $x_n$ represents the state vector with elements given by $$x_n = \begin{bmatrix} \delta_n \\ \eta_n \end{bmatrix} \quad (3)$$

with $\delta_n$ being the frequency and $\eta_n$ rate of change of frequency. $F_n$ represents the state transition matrix and is specified based on prior knowledge of how state vector $x_n$ is generated. For example $F_n$ can be set as $$F_n = \begin{bmatrix} 1 & f(t_n) \\ 0 & 1 \end{bmatrix} \quad (4)$$

where $f(t_k)$ represents how frequency changes with time. In equations 1 and 2 $w_n$ is the process noise variance and represents the uncertainty in the estimate of the states, $v_n$ is the measurement noise variance and represents uncertainty in measured input data, $y_n$ is the measured clock data from output of block 3000 and finally $H_n$ is given by $$H_n = \begin{bmatrix} 1 & 0 \\ 0 & 0 \end{bmatrix} \quad (5)$$

A Kalman algorithm can be used to estimate state vector given by following equations $$P_n^- = F_{n-1} P_{n-1}^+ F_{n-1}^T + Q_{n-1} \quad (6)$$

$$K_n = P_n^- H_n^T (H_n P_n^- H_n^T + \sigma_n^2)^{-1} \quad (7)$$

$$\hat{x}_n^- = F_{n-1} \hat{x}_{n-1}^+ \quad (8)$$

$$\hat{x}_n^+ = \hat{x}_n^- + K_n (y_n - H_n \hat{x}_n^-) \quad (9)$$

$$P_n^+ = P_n^- - K_n H_n P_n^- \quad (10)$$

where in above equations:

$$Q_n = E[w_n w_n^T] \quad (11)$$

and $$\sigma_n^2 = E[v_n^2] \quad (12)$$

Also $\hat{x}_n^-$ and $\hat{x}_n^+$ are respectively a priori and a posteriori state estimates of state vector $x_n$ and $P_n^-$ and $P_n^+$ are corresponding covariance matrices of the estimation error. During network quiet periods, using the output values of the block 3000, the Kalman filter is trained to find the best estimate of the frequency $\delta_n$. When there are no quiet periods, the Kalman filter will predict frequency $\delta_n$ based on equation (8). The block 700 measures the prediction time. The prediction time is used as a measure of confidence in predicted values. Longer training periods and shorter prediction periods mean more confidence in estimated output.

The block 4000 compares output variations of the block 3000 with the predicted ones from the block 6000. Under normal working conditions (e.g. when network traffic is low) it is expected that output of the block 3000 will be close in value to the block 6000. Under high traffic network condition, output of the block 3000 can be affected by high packet delay variations of timing packets and so its value can be much different from the one predicted by the block 6000. If the output values of the block 3000 are beyond the predicted values by some threshold (which adaptively sets based on prediction time) then predicted values are used to update the DCO 5000.

In FIG. 3, the output of the block 4000 is calculated based on following $$(1-\beta(T_p)) \times f_e \leq f_c \leq (1+\beta(T_p)) \times f_e \rightarrow f_d = f_c \quad (13)$$

else $f_d = f_e$ where $f_c$ is the output of the block 3000, $f_e$ is the output of the frequency prediction block 6000, $0 < \beta(T_p) \ll 1$ defines the acceptance threshold for $f_c$. Higher values for $\beta$ means that more emphasis in put on the output of the block 3000 rather than output of the block 6000. Lower values of $\beta$ means that there is higher confidence in predicted output values of the block 6000.

$\beta(T_p)$ by itself is determined by $T_p$ which is the prediction time. For longer prediction time $\beta(T_p)$ can be set to lower values (e.g. <1e-9) while for shorter training times it can be set to higher values (e.g. 5e-9). The prediction time is measured by prediction timer 700.

It will thus be seen that the invention makes use of quiet periods in the network PDV to enhance performance of the timing recovery over packet algorithm. The frequency prediction system is trained during quiet periods and can predict DCO update values during times that network PDV is high and not suitable for timing recovery algorithm. The frequency validation mechanism compares output of timing recovery algorithm with the one estimated through frequency prediction circuit and calculates the best DCO update value.

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. The term circuit is used herein to encompass functional blocks that may in practice be implemented in software.

The invention claimed is:

1. A method of recovering timing information in a packet network, comprising:
   receiving timing packets from a network;
   detecting quiet periods in the packet network when network packet delay variation (PDV) for the timing packets is low;
   training a frequency prediction unit during said quiet periods to learn output clock variations of a timing recovery circuit to permit the frequency prediction unit to predict frequency update values for a local oscillator during non quiet periods taking into account the historical output clock variations during quiet periods; and
   using the output of the timing recovery circuit as the active frequency update values during quiet periods and said frequency prediction circuit as the active frequency update values during non quiet periods.

2. A method as claimed in claim 1, wherein the output of the timing recovery unit is compared with the output of the frequency prediction unit, and when the frequency update values provided by the frequency prediction unit differ from the frequency update values provided by the timing recovery unit by a predetermined threshold, the frequency update values provided by the frequency prediction unit are selected as the active frequency update values.

3. A method as claimed in claim 2, wherein the threshold is adaptively varied based on the degree of confidence in the output of the frequency prediction unit.

4. A method as claimed in claim 3, wherein the degree of confidence is based on the time required for the frequency prediction unit to predict the frequency update values.

5. A method as claimed in claim 4, wherein the frequency update circuit comprises a Kalman filter.

6. A method as claimed in claim 5, wherein the Kalman filter produces the frequency update values based on the equation:

$$\hat{x}_n^- = F_{n-1}\hat{x}_{n-1}^+$$

where $F_n$ represents the state transition matrix and $\hat{x}_n^-$ and $\hat{x}_n^+$ are respectively a priori and a posteriori state estimates of the state vector $x_n$.

7. A method as claimed in claim 1, wherein the local oscillator is a digital controlled oscillator (DCO).

8. A timing recovery unit for use in a packet network, comprising:
a local oscillator for producing a local output clock;
a timing recovery circuit responsive to timing packets received over a network to produceg frequency update values for the local oscillator;
an activity detector for detecting quiet periods in the packet network when network packet delay variation (PDV) of the timing packets is low;
a frequency prediction circuit for predicting update values for the local oscillator during non quiet periods, and wherein the frequency prediction circuit is configured to learn output clock variations of a timing recovery unit to permit the frequency prediction unit to use the historical clock variations to predict frequency update values during non quiet periods; and
a selection circuit for selecting the output of said frequency prediction unit as the active frequency update values for the local oscillator during non quiet periods and the output of the timing recovery circuit as the active frequency update values for the local oscillator during quiet periods.

9. A timing recovery unit as claimed in claim 8, further comprising a selection unit that compares the output of the timing recovery unit with the output of the frequency prediction unit, and when the frequency update values provided by the frequency prediction unit differ from the frequency update values provided by the timing recovery unit by a predetermined threshold selects the frequency update values provided by the frequency prediction unit as the active frequency update values.

10. A timing recovery unit as claimed in claim 9, wherein the selection unit is configured to adaptively vary the threshold based on the degree of confidence in the output of the frequency prediction unit.

11. A timing recovery unit as claimed in claim 10, further comprising a timing circuit for measuring the time required for the frequency prediction unit to predict the frequency update values, and wherein the degree of confidence is based on the measured time.

12. A timing recovery unit as claimed in claim 11, wherein the selection unit selects the update values based on the relationship:

$$(1-\beta(T_p)) \times f_e \leq f_c \leq (1+\beta(T_p)) \times f_e \rightarrow f_d = f_c$$

where $f_c$ is the output of the timing recovery circuit, $f_e$ is the output of the frequency prediction circuit, and $0 < \beta(T_p) \ll 1$ defines the acceptance threshold for $f_c$.

13. A timing recovery unit as claimed in claim 8, wherein the frequency prediction unit comprises a Kalman filter.

14. A timing recovery unit as claimed in claim 13, wherein the Kalman filter is configured to produce the frequency update values based on the equation:

$$\hat{x}_n^- = F_{n-1}\hat{x}_{n-1}^+$$

where $F_n$ represents the state transition matrix and $\hat{x}_n^-$ and $\hat{x}_n^+$ are respectively a priori and a posteriori state estimates of the state vector $x_n$.

15. A timing recovery unit as claimed in claim 8, wherein the activity detector comprises a feature extraction circuit, a minimum maximum estimator, and a comparator for comparing the difference between the minimum and maximum values of the extracted features.

16. A timing recovery unit as claimed in claim 15, wherein the extracted feature is the variance of the raw delays.

17. A timing recovery unit as claimed in claim 15, wherein the extracted feature is the variance of the minimum delays over a series of time periods.

18. A timing recovery unit as claimed in claim 8, wherein the local oscillator is a digital controlled oscillator (DCO), and the update values are the frequency update values for the DCO.

* * * * *